United States Patent [19]

Salmon et al.

[11] Patent Number: 5,428,519
[45] Date of Patent: Jun. 27, 1995

[54] DEVICE FOR ADJUSTING A MOVING POSITION OF A HEADLIGHT, A HEADLIGHT INCLUDING THE DEVICE, AND A METHOD OF INSTALLING THE DEVICE

[75] Inventors: Jean Salmon, Ath; Jean-Pierre Loiselet, Rebaix, both of Belgium; Vincent Demarcq, Marly, France

[73] Assignee: Valeo Vision, Bobigny, France

[21] Appl. No.: 94,252

[22] Filed: Jul. 20, 1993

[30] Foreign Application Priority Data

Jul. 21, 1992 [FR] France .................... 92 08989

[51] Int. Cl.$^6$ ............................................. B60Q 1/06
[52] U.S. Cl. ............................... 362/421; 362/66; 362/285; 362/457; 403/90; 403/142; 403/326
[58] Field of Search ............... 362/66, 269, 285, 287, 362/421, 277, 282, 457; 403/90, 103, 122, 141, 142, 326, 342

[56] References Cited

U.S. PATENT DOCUMENTS

| | | | |
|---|---|---|---|
| 4,607,976 | 8/1986 | Peek et al. | 403/141 |
| 4,870,544 | 9/1989 | Iwamoto | 362/66 |
| 5,319,529 | 6/1994 | Lukkarinen et al. | 362/66 |
| 5,322,252 | 6/1994 | Puente | 362/421 |

FOREIGN PATENT DOCUMENTS

0393353 10/1990 European Pat. Off. .
3425646 10/1985 Germany .

*Primary Examiner*—Ira S. Lazarus
*Assistant Examiner*—Alan B. Cariaso

[57] ABSTRACT

An adjustment device for adjusting a moving portion of a motor vehicle headlight relative to a fixed portion, in particular a reflector relative to an intermediate part of the headlight, the device being of the type comprising a screw that includes a ball member received in a seat connected to one of the portions and a thread engaging in tapping connected to the other portion, wherein the ball seat and the tapping are respectively provided on two elements each including assembly means enabling it to be assembled to corresponding assembly means provided on said respective portions merely by relative displacement.

11 Claims, 2 Drawing Sheets

DEVICE FOR ADJUSTING A MOVING POSITION OF A HEADLIGHT, A HEADLIGHT INCLUDING THE DEVICE, AND A METHOD OF INSTALLING THE DEVICE

The present invention relates to a device for adjusting a moving part of a motor vehicle headlight, in particular a reflector thereof, the device being of the type that includes a rotatably drivable screw engaged firstly with a fixed portion of the headlight that is secured to the bodywork of the vehicle, and secondly with the moving portion for the purpose of changing its orientation when said screw is rotated.

BACKGROUND OF THE INVENTION

Provision is normally made for such a device to be assembled by manufacturing said fixed portion and said moving portion of the headlight with appropriate facilities that co-operate with a screw that is installed subsequently, thereby completing the device.

It will easily be understood that such a method is burdensome in several respects.

Since the initial design includes special headlight portions having respective facilities, the facilities in question cannot be standardized. This complicates overall manufacture of the headlight to a great extent.

In addition, a device designed wherein conventional manner requires a certain number of manual operations to be performed that are difficult to automate, in particular operations relating to installing the adjustment screw between the elements it interconnects.

Documents U.S. Pat. No. 4,870,544 and EP-A-0 393 353 teach adjustment devices which although somewhat easier to install on a headlight, remain unsuitable for automated assembly.

OBJECTS AND SUMMARY OF THE INVENTION

An object of the present invention is to remedy the above drawbacks by making it extremely simple to assemble an adjustment device, and which is suitable for being automated.

To this end, the present invention provides, in a first aspect, an adjustment device for adjusting a moving portion of a motor vehicle headlight relative to a fixed portion, in particular a reflector relative to an intermediate part of the headlight, the device being of the type comprising a screw that includes a ball member received in a seat connected to one of the portions and a thread engaging in tapping connected to the other portion, wherein the ball seat and the tapping are respectively provided on two elements each including assembly means enabling it to be assembled to corresponding assembly means provided on said respective portions merely by relative displacement.

In a second aspect, the invention provides a motor vehicle headlight of the type comprising a moving portion such as a reflector capable of being adjusted in orientation relative to a fixed portion such as an intermediate part between the reflector and a glass, wherein between the moving portion and the fixed portion it includes at least one adjustment device as defined above.

Finally, the invention also provides a method of assembling an adjustment device as defined above on a headlight that comprises a moving portion such as a reflector that is suitable for being adjusted in orientation relative to a fixed portion such as an intermediate piece between the reflector and a glass, the method comprising the following steps:

(a) positioning the moving portion and the fixed portion in a predetermined mutual relationship;
(b) pre-assembling the screw with each of the two elements of the adjustment device;
(c) mounting one of the elements on the associated portion of the headlight; and
(d) mounting the other element on the other portion of the headlight.

BRIEF DESCRIPTION OF THE DRAWINGS

The invention will be better understood and other characteristics thereof will be shown up by the following description given with reference to the accompanying diagrammatic drawings that show, by way of example, how the invention may be implemented, and in which.

MORE DETAILED DESCRIPTION

Figure 1:
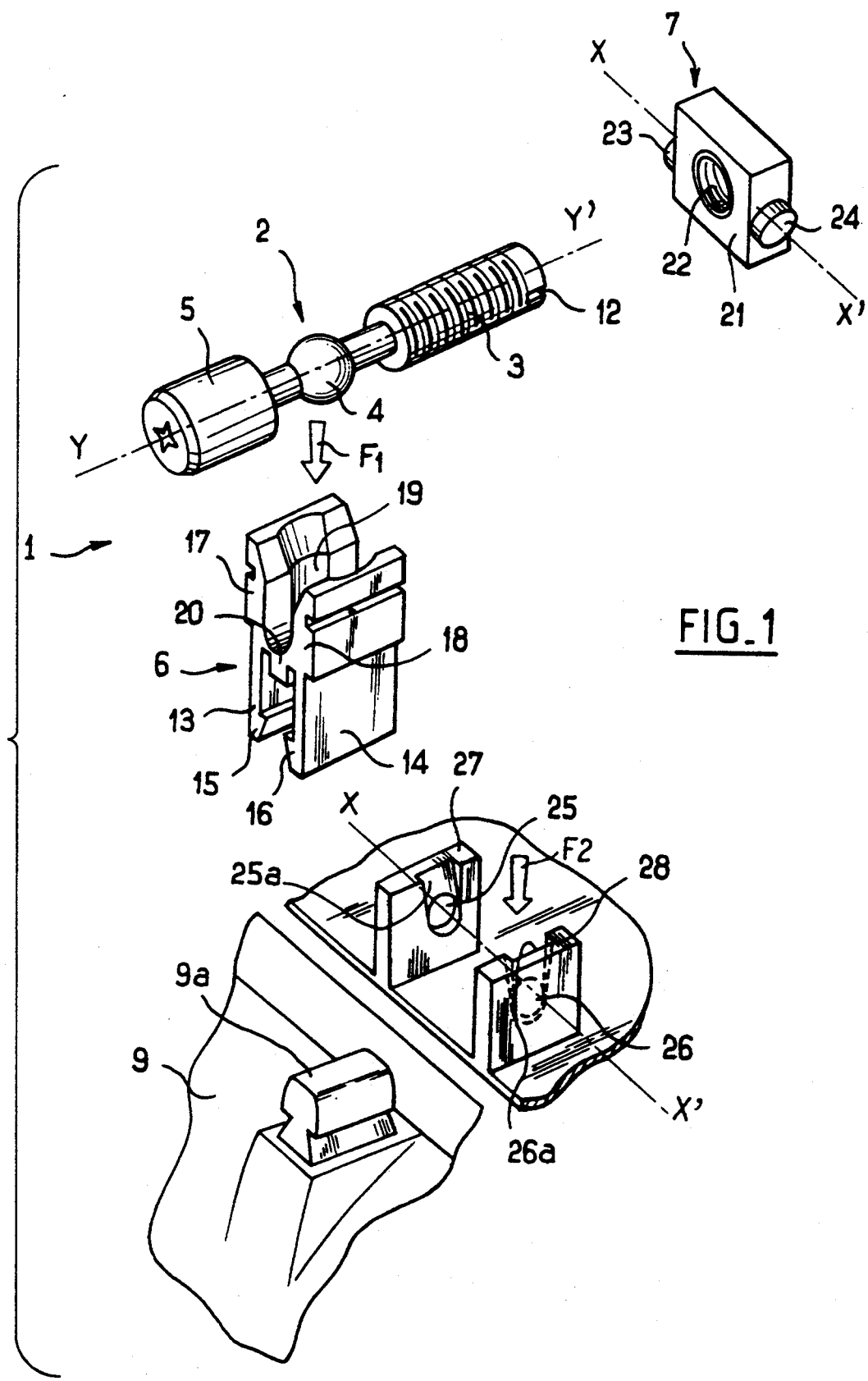
FIG. 1 is an exploded perspective view of an adjustable assembly device for a reflector.

The adjustable assembly device given overall reference 1 comprises an adjustment screw 2 which has a threaded end portion 3 and a ball member 4 formed in an intermediate portion thereof.

The screw 2 also includes two drive members disposed at each of its free ends, one of which is constituted by a knob 5 for receiving manual drive and the other of which is constituted by a slot 12 for receiving a tool such as a screwdriver. This means that the screw 2 will subsequently be rotatable from either end, depending on its disposition in the vehicle.

The adjustment screw 2 is designed to engage two distinct assembly elements, one of which, given overall reference 6, is designed to co-operate with a moving portion of a headlight, in this case a reflector 9, and the other of which given a reference 7 is designed to cooperate with a fixed portion 10 of the same headlight.

In the present example, the fixed portion 10 is constituted by an intermediate part secured to the bodywork of the vehicle and interposed between a diffusion glass 11 of the headlight and the adjustable reflector 9, the glass 11 being secured to the intermediate part 10.

The assembly element 6 for co-operating with the moving reflector 9 is constituted firstly by a lower portion defining two parallel tabs 13 and 14 designed to engage on a corresponding fixing portion 9a of the reflector 9 and held thereon by catches 15 and 16 that face each other at the bottom ends of said resilient tabs 13 and 14, and secondly by an upper portion formed by two webs 17 and 18 which define between them a partially spherical seat 19 and which are deformable to enable them to receive the ball member 4 provided on the adjustment screw 2, said lower and upper portions being interconnected by a central link portion 20.

The said assembly element 6 is advantageously obtained by a single plastics molding operation.

In addition, the assembly element 7 for co-operating with the fixed portion 10 of the headlight is constituted by a member 21 that comprises a central tapped hole 22 for receiving the threaded portion of the screw and that includes two cylindrical side studs 23 and 24 suitable for snap-fastening in corresponding housings 25 and 26 lying on an axis X-X' that is perpendicular to the axis Y-Y' of the screw 2, and formed in respective facing faces of two parallel tabs 27 and 28 projecting upwards from the fixed portion 10 of the headlight. The housings 25 and 26 are associated with pairs of ramps 25a and 26a that extend essentially vertically between said housings and the upper free edges of the tabs 27 and 28. By guiding the studs 23 and 24 into the associated recesses, with temporary resilient deformation of the tabs 27 and 28, these ramps enable the member 21 to be installed in an essentially vertical orientation.

The element 7 thus forms a nut which is hinged on the tabs 27 and 28 by means of the studs 23 and 24.

To seal the inside space of the headlight, a resiliently compressible gasket 29 is disposed between a peripheral end portion 9b of the reflector and a corresponding portion 10a of the intermediate piece 10 that overlies it.

The method of assembling tilting the reflector and the intermediate part by means of the elements 2, 6, and 7 may be as follows:

the adjustment screw 2 is engaged in the element 6 by forcing the ball member 4 into the seat 19 defined between the webs 17 and 18 with temporary resilient deformation of the webs, the ball being inserted in the direction of arrow F1;

the nut-forming element 7 is screwed onto the threaded portion 3 of the screw; and the elements 6 and 7 once pre-assembled in this way by means of the adjustment screw 2 are snap-fastened vertically respectively onto the portion 9a of the reflector 9 and onto the portion 10a of the intermediate part 10.

In particular, the nut-forming element 7 is assembled between the upright tabs 27 and 28 by engaging its studs 23 and 24 in the housings 25 and 26 along the direction of arrow F2 by camming along the ramps 25a and 26a, with said tabs being subjected to temporary resilient deformation. The element 6 may be fixed on the portion 9a of the reflector 9 during the same vertical movement (F1) from above, with the tabs 13 and 14 being temporarily splayed apart resiliently.

Figure 2:
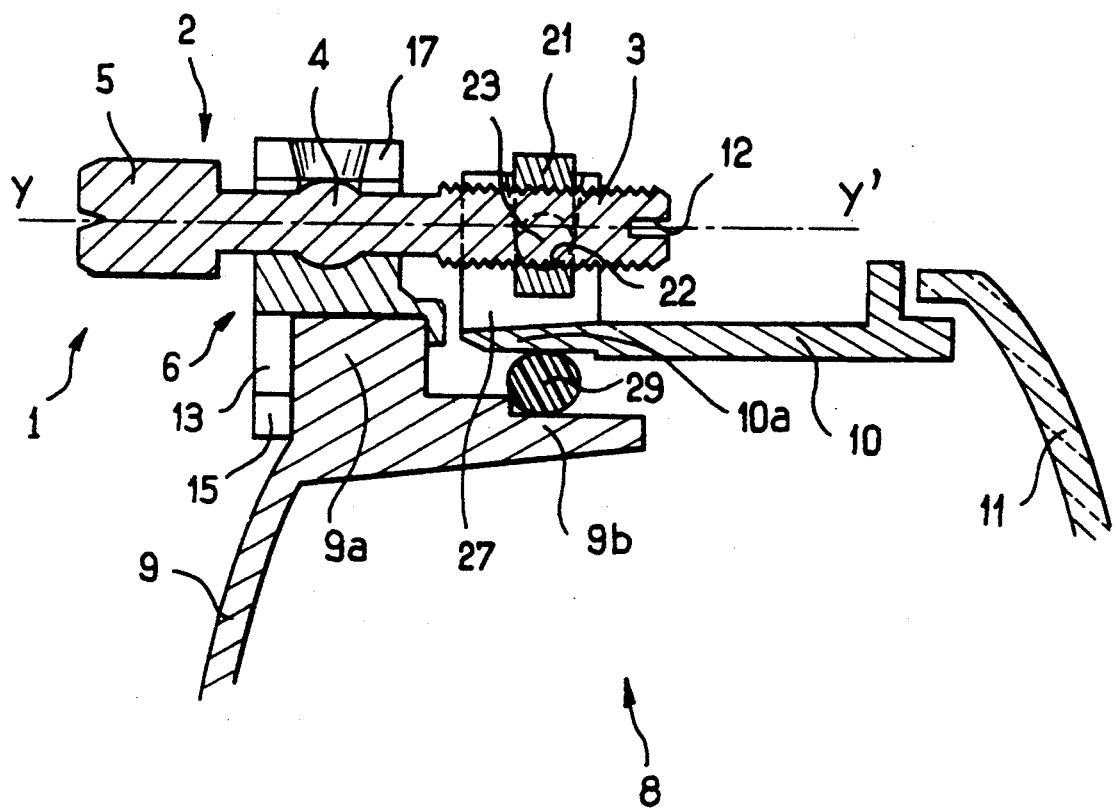
FIG. 2 is an axial vertical section view through the device of FIG. 1 after assembly.

In the present example, in order to secure the element 6 relative to the reflector 9 and along the axis Y-Y', it is advantageous (as shown in FIG. 2) to provide for a rim of the element 6 to engage against the face of the portion 9a that faces towards the intermediate element 10.

Naturally, any other equivalent disposition could be provided.

Naturally, any other assembly procedure made possible by the modular nature of the adjustment device could be adopted.

To enable the beam to be adjusted in elevation and in azimuth, a headlight is preferably fitted with two snap-fastening adjustment devices of the invention, and associated with a non-adjustable coupling that pivots via curved slideways, a ball, or the like.

Such a device mounted in this way on a headlight operates as follows.

When the screw 2 is rotated in one direction or the other, relative angular tilting is applied to the reflector 9.

Such tilting is made possible without mechanical stress firstly because the ball member 4 enables the screw 2 to pivot relative to the reflector 9 via the part 6, and secondly because the nut 7 is hinged relative to the intermediate element via its studs 25, 26 and the tabs 27, 28, thereby enabling it to track the screw 2 angularly during adjustment.

Finally, it may be observed that the configuration of the screw 2 having an intermediate ball member 4 and two drive members 5 and 12 situated on either side of the ball member makes it possible for orientation to be adjusted equally well from in front or from behind the headlight. Naturally, such a screw could advantageously be used in adjustment devices of types that differ from that of the present invention.

We claim:

1. An adjustment device for adjusting a reflector of a motor vehicle headlight relative to a fixed portion of said headlight; the device comprising an adjustment screw that includes a ball member received in a seat in a first element connected to one of said reflector and fixed portion and having a threaded portion engaging a threaded opening in a second element connected to the other of said reflector and fixed portion, wherein a first snap-fit fastening means is provided between one of said first and second elements and one of said reflector and said fixed portion, and a second snap-fit fastening means is provided between another of said first and second elements and the other of said reflector and said fixed portion, said first and second snap-fit fastening means being engageable by displacement of said first and second elements relative to said reflector and said fixed portion in directions generally parallel to each other.

2. A device according to claim 1, wherein said directions are essentially perpendicular to the axis of the screw.

3. A device according to claim 1, wherein the ball member is provided in an intermediate region of the screw situated between a drive knob and the threaded portion, and wherein the ball seat is defined between two branches of said first element, said branches defining a passage for the screw.

4. A device according to claim 1, wherein the screw includes other drive means at an end adjacent said threaded portion.

5. A device according to claim 1, wherein said first snap-fit fastening means include tab means on said first element and a correspondingly shaped zone of said one of said reflector and said fixed portion.

6. A device according to claim 1, wherein said second snap-fit fastening means are arranged so as to provide said threaded opening with a degree of pivoting movement about an axis that is generally perpendicular to the axis of said screw.

7. A device according to claim 6, wherein said second element includes oppositely projecting studs suitable for engagement in complementary openings provided in two surfacing faces of said other of said reflector and said fixed portion, entrance ramps adjacent said openings, the studs extending essentially perpendicular to the axis of the screw after assembly.

8. A motor vehicle headlight comprising at least one adjustment device according to claim 1, whereby a reflector is capable of being adjusted in orientation relative to a fixed portion such as an intermediate part between the reflector and a glass.

9. A headlight according to claim 8, wherein said first element is mounted on said reflector and said second element is mounted on the fixed portion.

10. A method of assembling an adjustment device on a headlight that includes a reflector capable of being adjusted in orientation relative to a fixed portion such as an intermediate part between the reflector and a glass, said adjustment device comprising an adjustment screw that includes a ball member received in a seat connected to one of said reflector and fixed portion and a threaded portion engaging a threaded opening on the other of said reflector and fixed portion, wherein the ball seat and the threaded opening are respectively provided on first and second elements, first snap-fit fastening means are provided between one of said elements and one of said reflector and said fixed portion, and second snap-fit fastening means are provided between another of said elements and the other of said reflector and said fixed portion, said first and second snap-fit fastening means being engageable by displacement of said first and second elements relative to said reflector and said fixed portion in directions generally parallel to each other, the method comprising the following steps:

(a) positioning the reflector and the fixed portion in a predetermined mutual relationship;
(b) pre-assembling the screw with each of the two elements of the adjustment device; and
(c) mounting said elements on said reflector and said fixed portion by displacement of said pre-assembled screw and first and second elements relative to said reflector and said fixed portion.

11. A method according to claim 10, wherein step (c) is performed by moving the preassembled screw and elements in a direction substantially perpendicular to an axis of the screw.

* * * * *